A. BARE.
Evaporating Pan.
No. 34,728.  Patented Mar. 25, 1862.
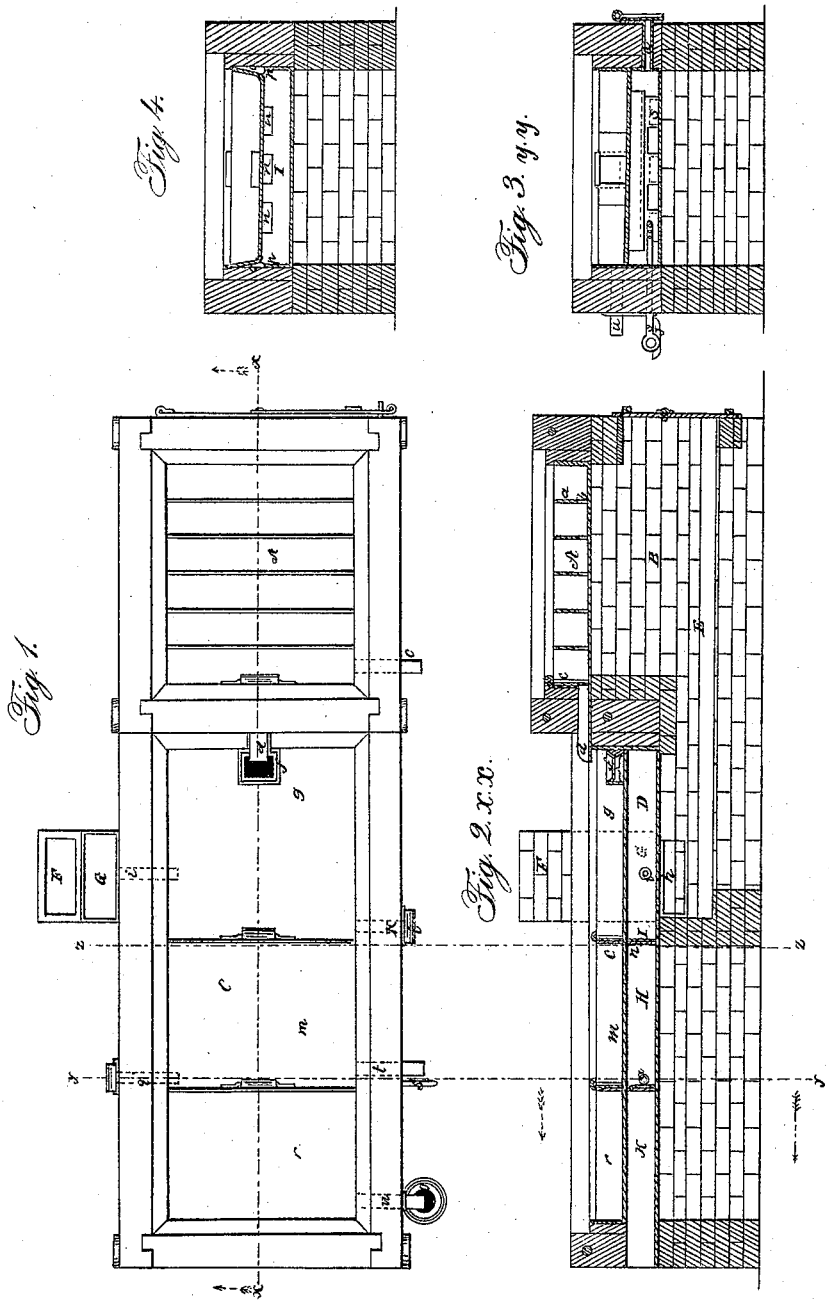
Witnesses:
Inventor:

UNITED STATES PATENT OFFICE.

ABRAHAM BARE, OF MEXICO, OHIO.

IMPROVED EVAPORATOR FOR SACCHARINE JUICES.

Specification forming part of Letters Patent No. 34,728, dated March 25, 1862.

*To all whom it may concern:*

Be it known that I, ABRAHAM BARE, of Mexico, in the county of Wyandot and State of Ohio, have invented certain new and useful Improvements in Pans for Evaporating Saccharine Juices; and I do hereby declare that the following is a description thereof in terms which I now think sufficiently full, clear, and exact, reference being had to the annexed drawings, making a part of this specification, in which—

Figure 1 is a top view; Fig. 2, a vertical section through the line $x$ $x$ of Fig. 1; Fig. 3, a cross-section through the line $y$ $y$ of Figs. 1 and 2, and Fig. 4 a cross-section through the line $z$ $z$ of the same figures.

The nature of my invention consists, mainly, in a double pan, the under part of which is used for water and steam, while the sirup is above, in combination with the pan generally in use, whereby I am enabled to evaporate thick or thin sirup free from danger of burning, and with any degree of heat desired, and at any desired point.

To enable others skilled in the art to make and use my invention, I will proceed to describe its construction and operation.

The first pan, A, is placed directly over the fire-arch B, and is provided with a series of bars, $a$, which prevent the passage of the scum while all the juice flows through the openings $b$ below the bars. A spout, $c$, at the corner enables me, when desirable, to clean the pan by a flow of water through it. Another spout, $d$, having a gate, $e$, at its inner end, admits the passage of the juice, clarified, into the strainer $f$, which is made removable, so that it may be cleaned at any time, and thence into the second pan, C, the first part or section, $g$, of which is directly over and firmly combined with the pan containing the water or steam-generator D, and which steam-generator and first section of second pan are both also directly over the fire-grates E. Directly opposite the first section of the second pan the fire is conducted into the chimney F, as seen at $h$; and between the chimney and arch and steam-generator, and directly over the flue $h$, is placed a heater, G, into which cold water is fed, from which it passes through tube $i$ into the steam-generator hot or warm, as desired, to supply the wants of the generator. A tube, $k$, passes through the arch from the bottom of the generator, and at the opposite side from the heater, by which means, on raising the gate $l$, I am enabled to discharge the water from the steam-generator when desired. Beneath the second or middle section, $m$, of the second pan is the steam-chamber H, into which the steam passes from the generator through openings $n$ $n$ in the top of the division or partition I, between the generator and steam-chamber, and so high above the water in the generator as to prevent any flow into the chamber. The steam is also admitted at the sides of the pan $o$ $o$ by allowing the partition I in the lower pan at each side to extend up higher than its center, so that openings may be made in the side above the water in the generator, and on each side of said partition, between the generator and chamber, as seen at $p$ $p$, Fig. 4. As soon as the water begins to boil in the generator the steam escapes freely into the steam-chamber, and is there retained, as desired, or allowed to escape through the valve or tube $q$ on the same side with the chimney, or is carried forward, if desired, to evaporate still further under the third section, $r$, in the second pan by drawing out the slide $s$ near the discharge-tube of the second evaporating-pan, which slide also allows steam to escape in quantities, as desired, to be used under the last pan; or it may be retained under the middle pan in the chamber, and the sirup drawn off at the spout $t$ discharging from that section. When finished, the sirup is drawn off from either the second or third sections of the second pan, which may be extended still farther; but it is never drawn off until after it reaches the section of evaporator over the steam-chamber, and is then passed through a strainer like that shown at J; or strainer J may be removed from tube $u$ when not needed there and placed on tube $t$. The end of the bottom K of the second pan from the fire is left open to allow condensed steam to pass off.

The operation of my improved evaporator is as follows: The juice is first boiled by the direct heat of the fire in the first pan, and there clarified. It then passes, as described, over the steam-generator, where the evaporation continues by the boiling of the water directly under it, while the fire is directly under the boiling water or steam-generator. It then passes over the steam-chamber, where steam alone continues the evaporation. It is then allowed to pass over the open rear space or into the last section, from whence it is drawn measurably cooled off. When the last section, $r$, is used as a cooler, the steam is allowed to escape from the chamber H through the valve or tube $q$. When used as an evaporator, the steam is allowed to pass through the valve $s$ and out at the end. The cooling-sections may be still further increased in number so as to obtain any temperature desired.

Having thus described my invention and shown the manner in which it operates, what I claim therein, and desire to secure by Letters Patent of the United States, is—

1. So constructing pans for evaporating saccharine juices as that in the first stages of evaporation it is done by the agency of fire alone, and in the second stages by steam, first closely confined and very hot, then in apartments less heated, the desired effect is attained.

2. That particular construction of evaporators wherein the same fire which evaporates in the first stages generates at the same time the steam for the second stages of evaporation.

3. The double pan, constructed as described, the first lower section of which contains the generator, the second the steam-chamber, and the third and additional sections for gradually decreasing the temperature, for the purposes set forth.

4. The slide or valve between the steam-chamber and the last section below, in combination with the double pan, substantially as and for the purpose described.

5. The heater or supply-pan for water, arranged as described, in combination with the generator, for the purpose set forth.

6. The first pan, constructed as described, in combination with the second pan, when its separate sections are heated by different degrees of heat, for the purpose set forth.

In witness whereof I have hereunto set my hand this 10th day of February, 1862.

ABRAHAM BARE.

Witnesses:
  A. W. BRINKERHOFF,
  M. C. GIBSON.